(12) United States Patent
Seth (10) Patent No.: US 11,947,893 B1
(45) Date of Patent: Apr. 2, 2024

(54) INTEGRATING MULTIPLE SLIDES FOR A PRESENTATION USING A GENERATED COMMON BACKGROUND

(71) Applicant: Microsoft Technology Licensing, LLC, Redmond, WA (US)

(72) Inventor: Rolly Seth, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/337,597

(22) Filed: Jun. 20, 2023

(51) Int. Cl.
*G06F 3/0482* (2013.01)
*G06F 40/106* (2020.01)
*G06T 11/00* (2006.01)

(52) U.S. Cl.
CPC .......... *G06F 40/106* (2020.01); *G06F 3/0482* (2013.01); *G06T 11/001* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 5,872,872 A * | 2/1999 | Kajiwara | ................... | G06T 3/00 382/296 |
| 8,560,952 B2 * | 10/2013 | Collins | ................. | G06F 40/186 715/256 |
| 9,329,777 B2 * | 5/2016 | Chung | ................. | G06F 3/04886 |
| 9,576,386 B2 * | 2/2017 | Zhao | ....................... | G06T 13/00 |
| 11,487,398 B1 * | 11/2022 | Wei | .......................... | G09G 5/14 |
| 2005/0078868 A1 * | 4/2005 | Chen | ..................... | G06F 16/739 345/428 |
| 2010/0031152 A1 * | 2/2010 | Villaron | ................ | G06F 3/0481 715/731 |
| 2011/0154266 A1 * | 6/2011 | Friend | ................... | A63F 13/213 715/863 |
| 2016/0005229 A1 * | 1/2016 | Lee | ......................... | G06T 11/60 345/419 |
| 2017/0316091 A1 * | 11/2017 | Edge | ....................... | G06F 40/10 |
| 2023/0129431 A1 * | 4/2023 | Sollami | .............. | G06F 3/04845 715/764 |
| 2023/0316697 A1 * | 10/2023 | Kondo | ................ | G06F 3/04845 382/282 |

OTHER PUBLICATIONS

"Generative Fill in Photoshop: How to Extend an Image", Retrieved From: https://www.photoshopessentials.com/photo-editing/extend-images-with-generative-fill/, Retrieved Date: Jun. 20, 2023, 15 Pages.

* cited by examiner

*Primary Examiner* — Daniel Rodriguez
(74) *Attorney, Agent, or Firm* — Novo TechIP International PLLC (57) ABSTRACT

A user device having a presentation application includes a processor; a memory storing the presentation application for implementation by the processor, alone or in combination with other processors. The application includes a user interface allowing a user to request integration of multiple slides into a single canvas with a common background generated by an Artificial Intelligence (AI) model based on backgrounds of the multiple slides being integrated into the single canvas.

20 Claims, 10 Drawing Sheets

INTEGRATING MULTIPLE SLIDES FOR A PRESENTATION USING A GENERATED COMMON BACKGROUND

BACKGROUND

Presentation and brainstorming applications provide tools for users to capture and organize content for collaboration, education and other purposes. Presentation applications, for example, allow a user to organize content in a series of discrete slides. The slides can then be displayed to an audience as the user describes the content. Brainstorming applications similarly allow the user to display a canvas that is visible to a number of collaborators. Ideas and content from any of the collaborators can be added to the canvas in an organic manner as a discussion or brainstorming session progresses.

However, currently available presentation and brainstorming applications place limitations on use of the content captured. For example, content stored by a presentation application in a series of discrete slides is not conducive to a brainstorming session in which it would be more advantageous for all the content to be display on a single canvas rather than on a sequence of discrete slides. In other scenarios, if a discussion or brainstorming session does not follow the linear progression of the slide sequence, it becomes difficult to find and display the content that is appropriate to the current topic in the conversation. These are technical problems presented by the rigidity of current presentation and brainstorming applications as compared to the fluidity of a human discussion or brainstorming session.

SUMMARY

In one general aspect, the following description presents a user device having a presentation application includes a processor; a memory storing the presentation application for implementation by the processor, alone or in combination with other processors. The application includes a user interface allowing a user to request integration of multiple slides into a single canvas with a common background generated by an Artificial Intelligence (AI) model based on backgrounds of the multiple slides being integrated into the single canvas.

In another general aspect, the following description presents a method of integrating multiple discrete slides into a single canvas for a presentation application includes: extracting background data from the multiple slides; identifying adjacent edges of the multiple slides when position on the single canvas; generating a fused background with a generative Artificial Intelligence (AI) model based on the background data from adjacent slide edges; and combining the multiple slides on the single canvas using the fused background.

In another general aspect, the following description presents a presentation application is stored on a non-transitory computer-readable medium, the medium storing instructions that, when executed by a processor, alone or in cooperation with other processors, implement the presentation application. The presentation application being operating to: provide a user interface in which a user can organize a series of multiple slides; receive a user request for integration of the multiple slides into a single canvas; utilize a generative Artificial Intelligence (AI) model to generate a common background based on background data extracted from the multiple slides; and combine the multiple slides on the single canvas using the common background.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

As noted above, currently available presentation and brainstorming applications can generally limit how content is presented and used. For example, traditional presentation or brainstorming applications organize content as either a series of separate slides or on one seamless canvas. Examples of a presentation application include PowerPoint® by Microsoft® and Google® Slides. An example of a brainstorming application includes Microsoft® Whiteboard. Traditionally, once a user starts with one kind of design it is difficult to move to the other style. For example, if a presentation is started as a series of discrete slides, there is no easy way to bring the content onto one seamless canvas for brainstorming such as in a whiteboard application.

However, as also noted above, content stored by a presentation application in a series of discrete slides is not necessarily conducive to a brainstorming session in which it would be more advantageous for all the content to be displayed on a single canvas or storyboard. Considering PowerPoint® as an example of a presentation application, PowerPoint® has a slide sorter view that allows a user to look at all the slides in a single view. This is similar to all the slides being on one canvas, but does not allow the user to interact with the content of each slide as in a brainstorming or whiteboard application.

In other scenarios, if a discussion or brainstorming session does not follow the linear progression of the slide sequence, it requires time and effort to find and display the content that is most appropriate to the current topic in the conversation. By the time this is performed, the conversation may have already moved to another topic.

Consequently, there are a number of technical problems presented by the rigidity of current presentation and brainstorming applications as compared to the fluidity of a human discussion or brainstorming session. The following description presents technical solutions to these technical problems. Specifically, the technical problem of matching presentation content to the fluidity of a human conversation is addressed.

The following description discusses the use of generative Artificial Intelligence (AI) technology to solve these technical problems. As explained here, the content of discrete slides, for example, is gathered seamlessly in a single canvas by analyzing adjacent slides and creating generative background content in between the slide content to match the slides. Specifically, with the help of an AI tool, this methodology converts slides having separate style and design content into one seamless storyboard/view. This can be done by creating tileable textures (no seam of join) between slides as the slides are connected at bottom/top/right/left edges. This stitching together of slides will make a seamless content board and can provide a more immersive experience than the user looking at discrete slides of dissimilar design.

With all the slide content in a single canvas view, the user no longer need worry about the sequential or linear flow of the slide deck when giving a presentation or facilitating a brainstorming session. The same will also apply if the user starts zooming in or out of the slide content or changes rotation angle of the slides. Story flow will always be there as stitching content can be generated real-time.

Figure 1A:
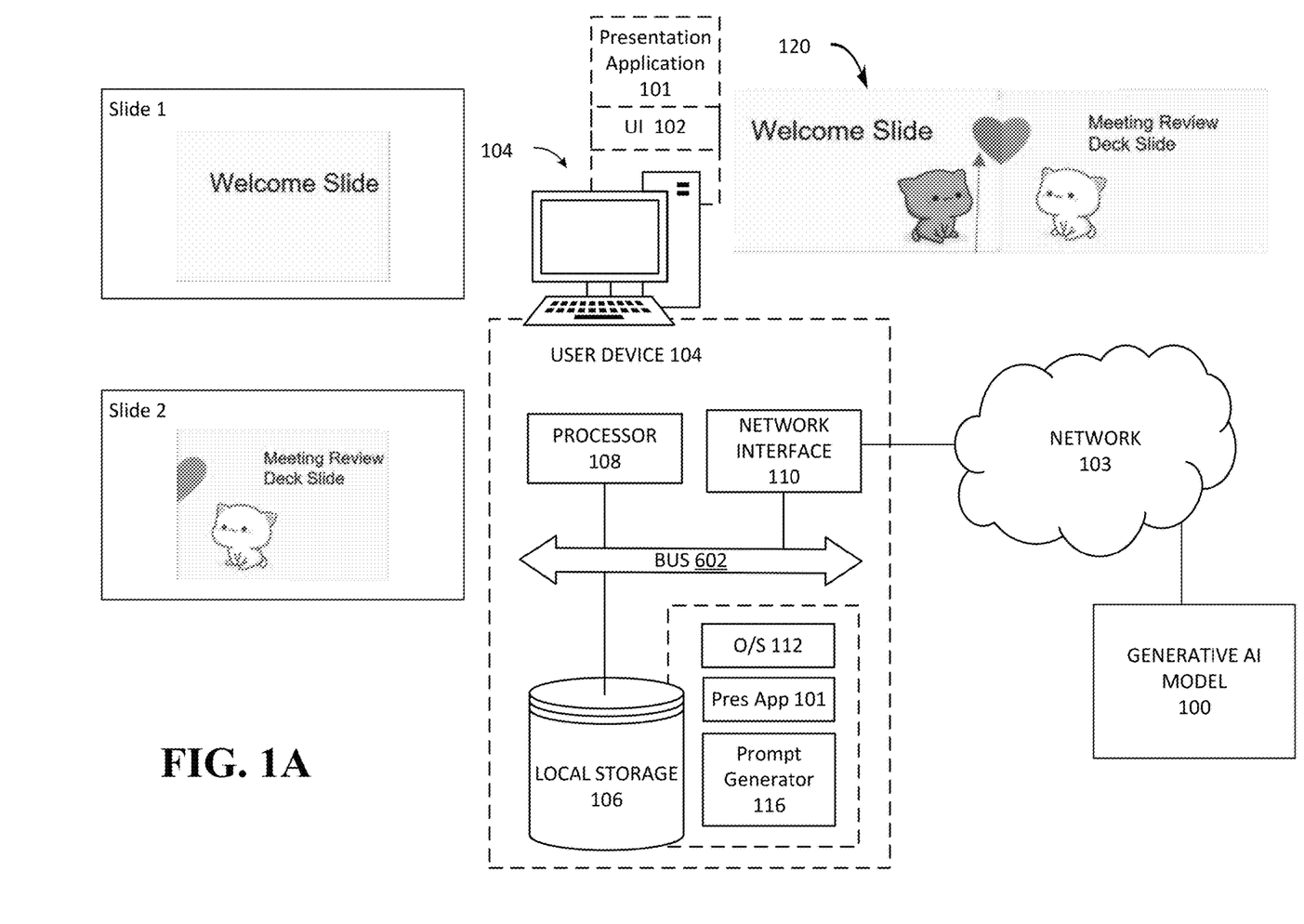
FIG. 1A depicts an example system in which aspects of this disclosure may be implemented.

FIG. 1A depicts an example system upon which aspects of this disclosure may be implemented. In the example of FIG. 1A, a user is operating a computer or user device 104. As described in greater detail below with respect to FIG. 6, the user device 104 includes a processor 108 and a memory or local data storage 106 storing an operating system 112. These elements are connected via a bus 602 to a network interface 110 for communicating via a network 103. This network 103 can be any computer network such as a local or wide area network or the internet. In this example, the user is executing a presentation application 101 using programming from the local storage 106. The presentation application 101 includes a user interface 102 that will be explained in greater detail below.

As shown in FIG. 1A, the user has created two slides (Slide 1 and Slide 2) in the presentation application 101. The slides use different styles, such as different background colors or themes. In the present example, only two slides are shown for simplicity. However, any number of different slides could be in the presentation that the user is creating. Having started a presentation with discrete slides, the user may decide that the content would be better presented on a single canvas. In the user interface 102 of the presentation application, the user has an option to combine the slides of the presentation on a single canvas.

When the user activates this option in the user interface 102, a prompt generator 116 is called by the presentation application 101. As described herein the prompt generator 116 can be incorporated into the presentation application 101 or may be a separate program or tool available on the user device 104. The prompt generator 116 will parse the data for each slide to distinguish between the content of the slide and the background of the slide.

In PowerPoint®, as an example of a presentation application 101, the user may select a theme for the slide deck. This theme may include particular colors, shapes, layouts that become the basis for each slide. The content of the slide is then placed on top of these background elements by their user. The content of the slide may be any of a variety of media types including text, audio, video, applets, widgets, etc. Alternatively, a user may not utilize a theme and may design each slide with unique set of background and content elements. In either case, the presentation application 101 distinguishes between background elements, which are located around the edges of the slide or underneath the slide content, and the content of the slide.

Using these location and other cues from the formatting of the presentation application 101, the prompt generator 116 distinguishes between the content of each slide and the background elements of the slide. The prompt generator 116 then prepares a prompt, i.e., an instruction, for a generative AI model 100 to create a unified environment for the content of the separate slides based on the original background elements of the slides. This prompt is then submitted via the network 103 to the generative AI model 100. Generative AI models that could be used in this system include, but are not limited to, DALL-E by Open AI and Stable Diffusion by Stability AI. The exact structure of the prompt will depend somewhat on the generative AI model used. For example, some generative AI models take input primarily in text form. In such a case, image data may be converted to JSON or a similar format for submission to the AI model along with textual instructions as to how the common background should be generated. Alternatively, an AI model may be multi-modal and accept both text and image input. In this case, the prompt could include image data for visual slide background elements along with instructions, perhaps textual, as to how the common background should be generated.

The generative AI model 100 will account for the background elements of the different slides and generate a new common background that is a blend or extrapolation of the original background elements of the slides. In the example of FIG. 1A, Slide 1 includes some text, which is considered the content of the slide. Slide 2 also includes some text content, but also includes a shape and cartoon animal at a left edge of the slide which are considered as background elements given their edge location and perhaps the formatting of the slide data. In this example, the generative AI model 100, operating on the prompt from the prompt generator 116, creates a unified appearance for the two slides on a single canvas as follows. A cartoon animal similar to the one from Slide 2 is inpainted to the area of Slide 1 in the united canvas 120. Also, the nondescript shape in Slide 2 is extrapolated by the generative AI to be part of a heart shape. The other portion of the heart shape is then inpainted to the area of Slide 1 in the united canvas 120. Consequently, the two slides are joined on a single canvas 120 in a manner that appears to be a coherent whole that would not have been the case if the slides where simply displayed contiguously without any modification.

The prompt generator 116 thus assembles the data for the background elements from the slides, including respective locations, and instructs the generative AI model 100 to create the coherent background around the content of slides. The model 100 returns to the presentation application 101 the modifications for the single canvas 120. The single canvas 120 can then be displayed in the user interface 102 for the user. The user will have the option of accepting the composition of the previously-discrete slides into a single canvas or can reject the suggestion and instruct the prompt generator 116 to try again. This will cause the generative AI model 100 to perform another iteration of creating a unified background for the slides. Given the random nature an AI model operates on a vast set of training data, each execution of the prompt from the generator 116 will produce a different result. The user can iterate the process until satisfied with the union 120 created for the slides.

Figure 1B:
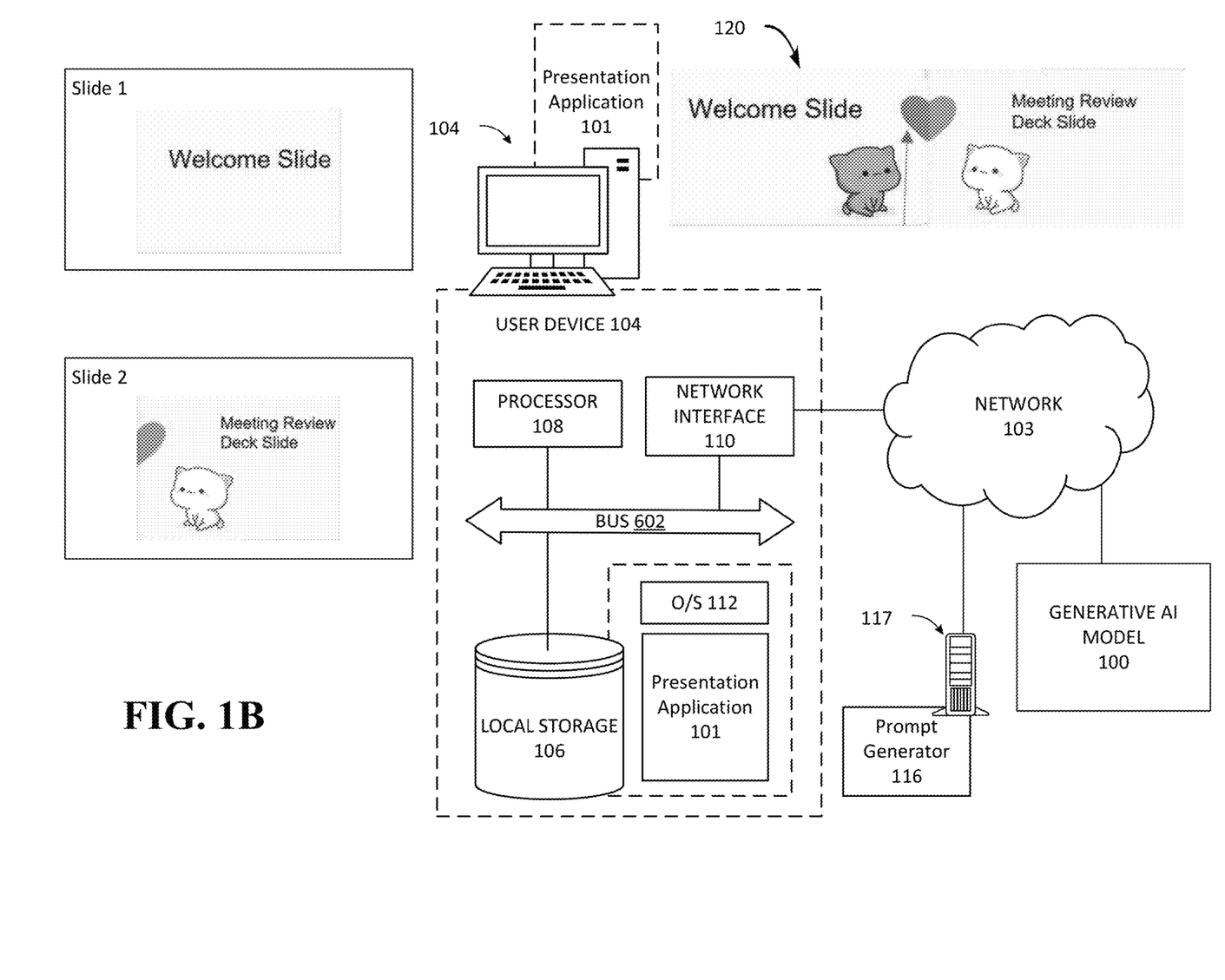
FIG. 1B depicts another example system in which aspects of this disclosure may be implemented.

FIG. 1B depicts another example system in which aspects of this disclosure may be implemented. The example shown in FIG. 1B is similar to that of FIG. 1A. However, as shown in FIG. 1B, the prompt generator 116 may not be a component of the presentation application or even be resident on the user device 104. Rather, the prompt generator 116, as described above, may be hosted on a server 117. In this arrangement, the presentation application 101 will call the prompt generator 116 as a service over the network 103. Thus, the prompt generator 116 may serve as an endpoint for the service described of integrating slides into a single canvas presentation.

Figure 1C:
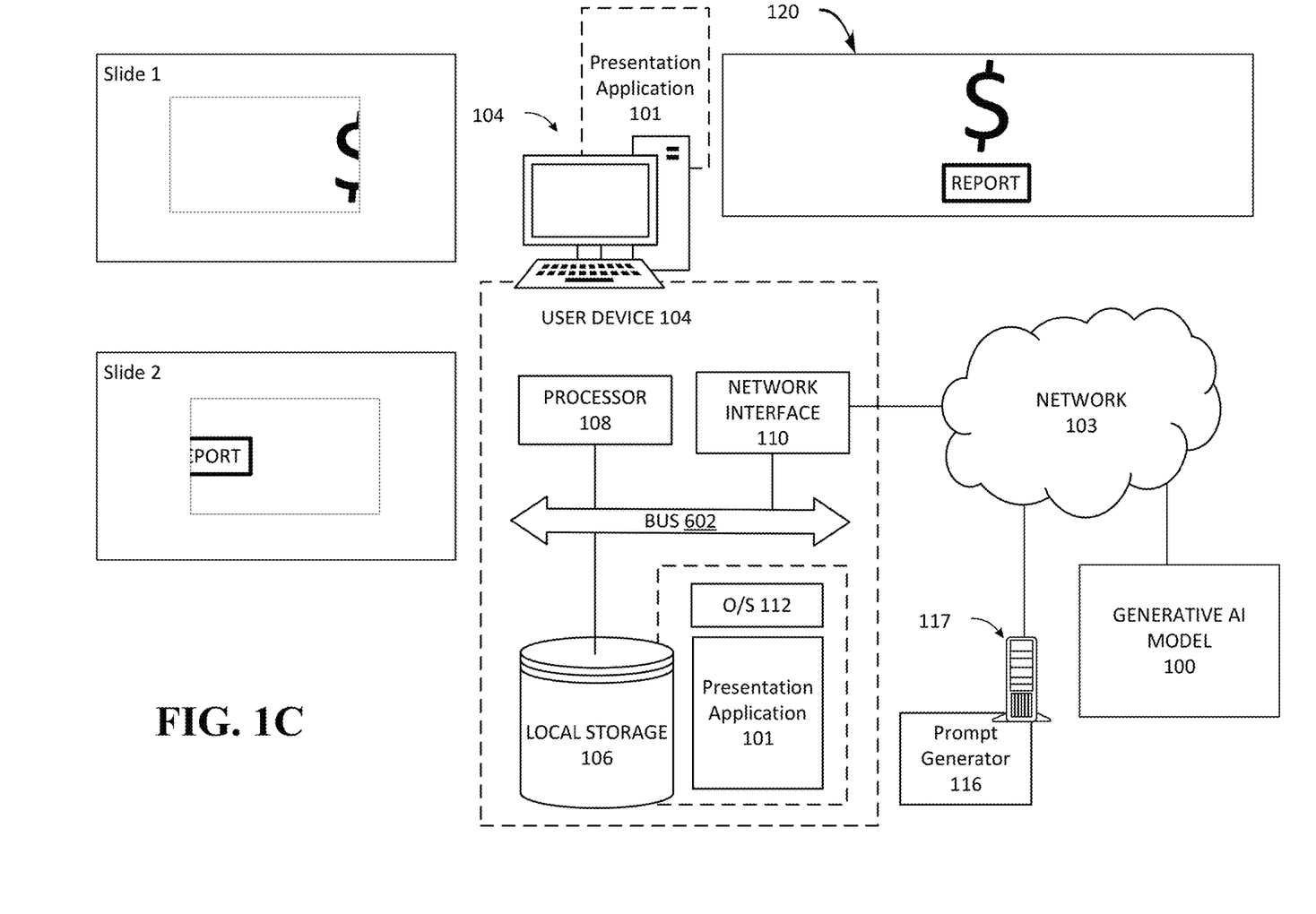
FIG. 1C depicts another example system in which aspects of this disclosure may be implemented.

FIG. 1C depicts another example system in which aspects of this disclosure may be implemented. As described herein, the system can use any elements along the edges or otherwise in the multiple input slides to create a common background or a stitching between two adjacent slides. FIG. 1C shows an example in which Slide 1 has a part of a symbol, e.g., a dollar sign, at the edge. In the combined canvas 120, the generative AI model 100 has recognized the partial dollar sign and completed the symbol in bridging the two slides. Similarly, Slide 2 include part of a box framing the word "REPORT." In the combined canvas 120, the generative AI model 100 has completed the frame and spatially associated the dollar sign symbol and text.

In various examples, any such elements among the multiple input slides may be extended, completed or otherwise utilized to create a common background or a bridge between the main content areas of adjacent slides when represented on a single canvas. For example, the system may use colors, dimensions, shapes, text lines or other elements that are whole or cropped at the edge of an input slide to build the common background or visual bridge for adjacent slides. This may include any looping animation/transition/video/gif, text font, outlines/line thickness, line patterns, opacity, style and patterns (such as checkered), inking, layers overlaid on the border (such as a background image+company logo+gradient semi-transparent color shade overlay). In FIG. 1B, the system used a shape from Slide 2 to complete a heart shape in the combined canvas. FIG. 1C is intended to further illustrate that any visual or style element can be extended, added to, blended or augmented in a common background or bridge area between adjacent content areas from multiple slides as moved into a single canvas.

Figure 2A:
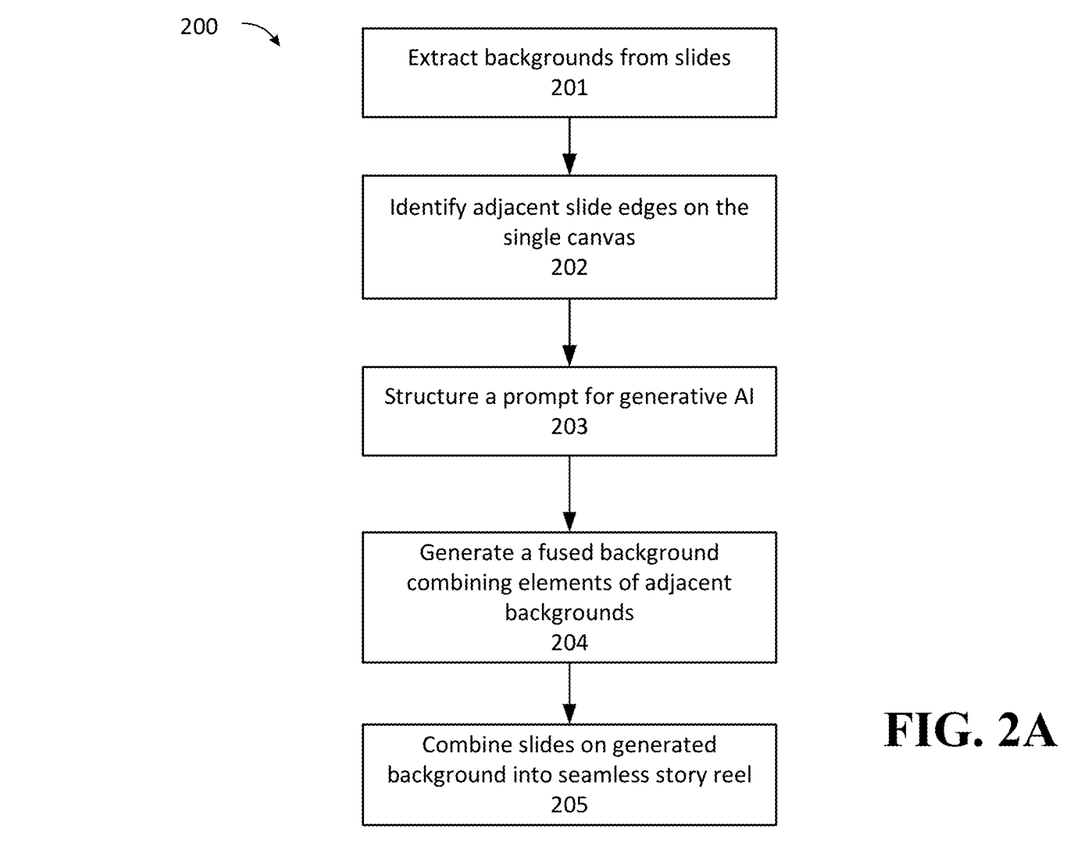
FIG. 2A is a flowchart illustrating an example method implementing aspects of this disclosure.

FIG. 2A is a flowchart illustrating an example method implementing aspects of this disclosure. As shown in FIG. 2A, the one example of a method of integrating multiple discrete slides into a single canvas includes: extracting 201 background data from the multiple slides based on data formatting or a location of an elements adjacent an edge of a slide; identifying 202 adjacent edges of the multiple slides when positioned on the single canvas; structuring 203 a prompt for a generative Artificial Intelligence (AI) model including the background data to produce a fused background for adjacent slides based on respective background data; generating 204 a fused background with the AI model based on the background data from adjacent slide edges; and combining 205 the multiple slides on the single canvas using the fused background such that slides are joined together as seamless content among the multiple slides.

Figure 2B:
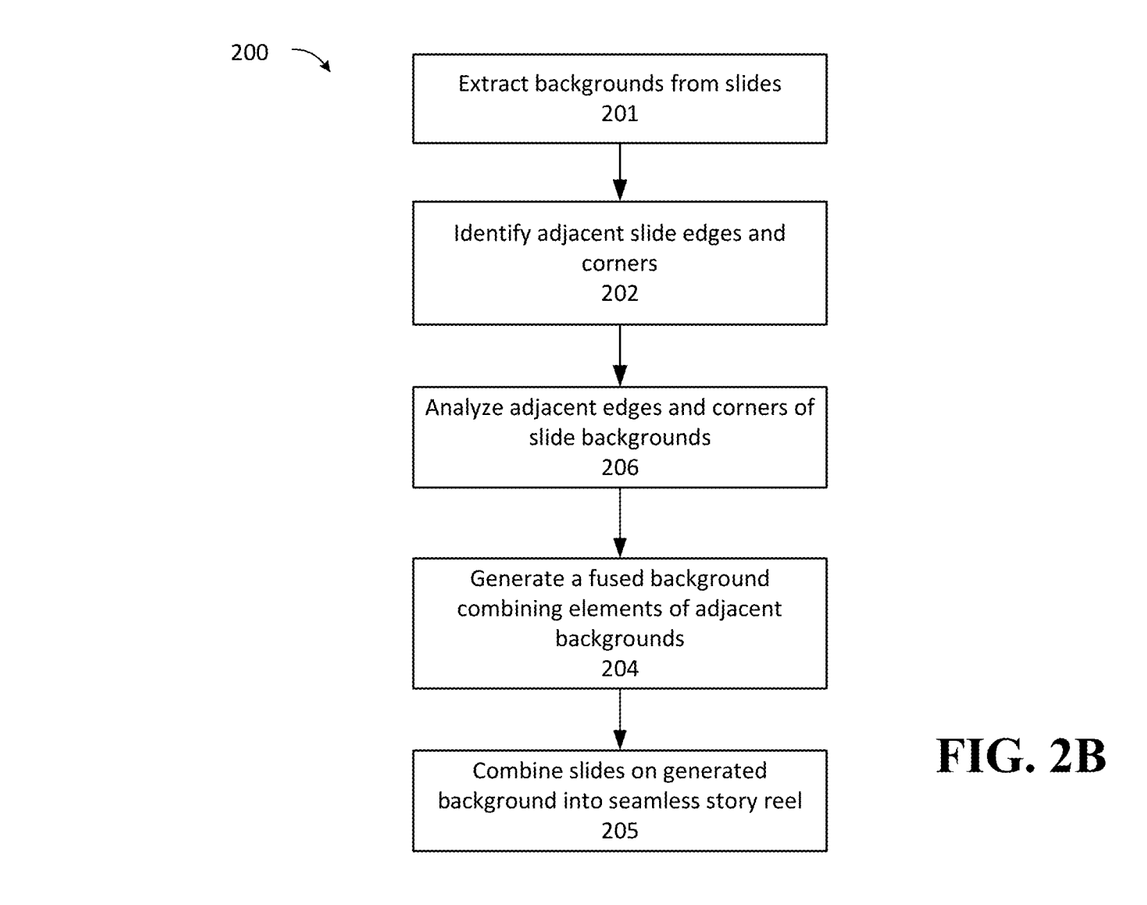
FIG. 2B is another flowchart illustrating an example method implementing aspects of this disclosure.

FIG. 2B is another flowchart illustrating an example method implementing aspects of this disclosure. As shown in FIG. 2B and consistent with the description above, the method 200 includes the following. First, the method will extract background data from the slides being combined 201. As noted above, the presentation application, in its formatting, can distinguish between background elements and the content that overlays the background. Background elements can also be identified based on position on the slide, such as the slide edges.

Next, the method can identify slide edges and corners that are or should be adjacent 202. This may be based on the order of the slides as in the example of FIGS. 1A and 1B. If the slides are sequential in the slide deck, the prompt generator may assume that the content of the slide should be adjacently placed in the resulting single canvas. Also, slides with identical or similar content may be adjacently placed in the resulting single canvas.

The method then analyzes adjacent edges and corners of the slide backgrounds 206 in preparing to generate content that unifies the slides in a single canvas. For example, the AI model may identify elements at the edges of one slide and inpaint complementary elements in an adjacent slide, as in the example above. In other examples, the system may determine that a particular color scheme predominates among the slides. Perhaps, the majority of the slides use a theme or background of blue and yellow, while some of the slides may use a theme with other colors. Noting that the majority used the theme of blue and yellow, the AI model will generate the unifying background for the slides with a theme of blue and yellow. This could be a determination made by the AI model or be part of the prompt from the prompt generator. For example, the prompt generator may run a color analysis of the slide data, determine predominant colors, and include in the prompt an instruction that the generation of the unifying background be based on those predominant colors.

Next, using the AI model, the method generates a fused background combining elements of adjacent backgrounds 204 to create a unified look and feel to the slide deck content when spread across a single canvas view. Lastly, the method combines the slides, specifically the slide content, on the generated background 205. This forms a seamless storyboard or story reel, a multi-directional, nonlinear presentation tool, or single brainstorming canvas.

Figure 3:
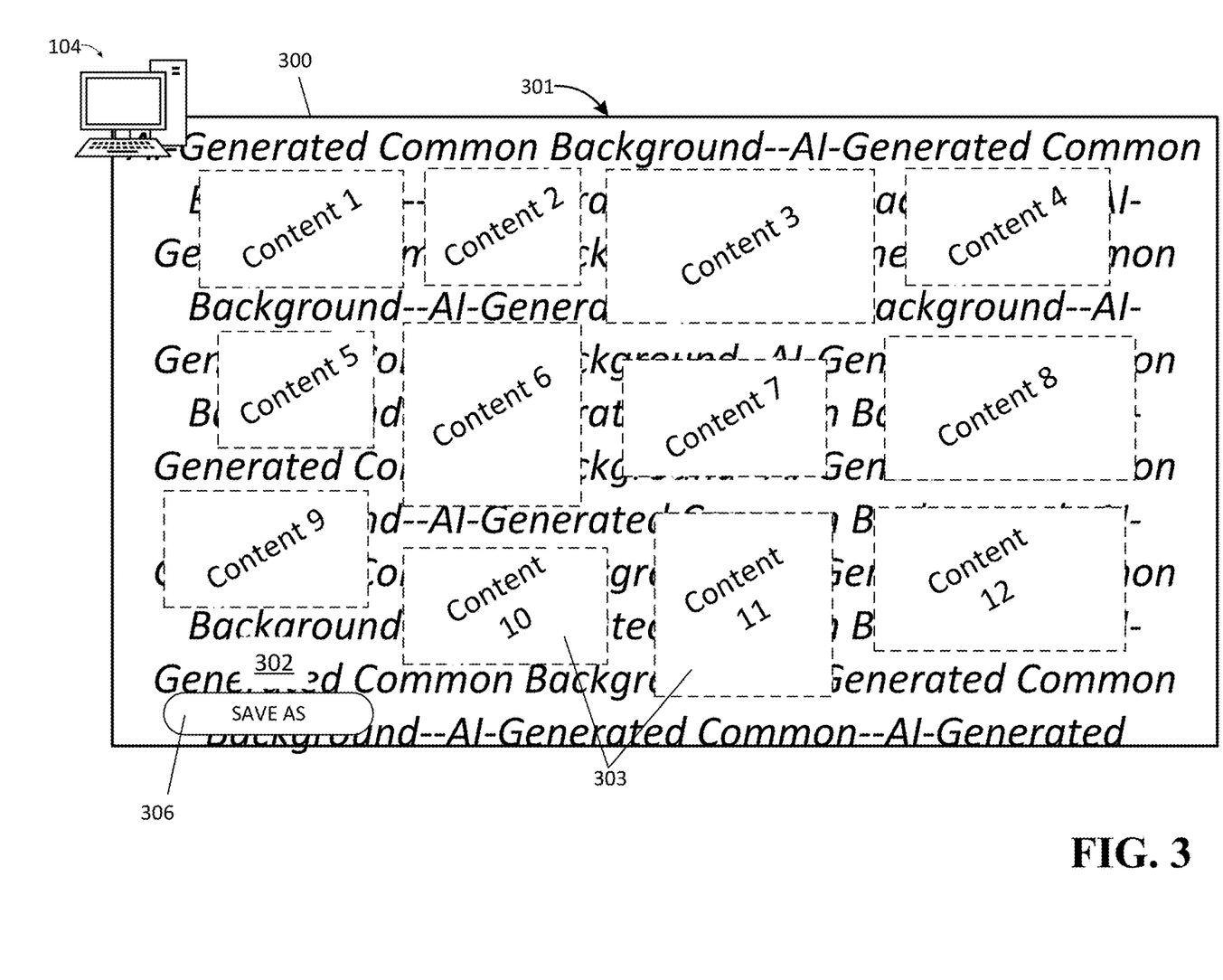
FIG. 3 depicts a user interface for an application implementing aspects of this disclosure.

FIG. 3 depicts a user interface for an application implementing aspects of this disclosure. As shown in FIG. 3, the user device 104 running a presentation application displays a user interface 300. In the interface 300, a unified single canvas 301 produced from twelve slides is displayed. As described above, data from the background elements of the slides is provided by the prompt generator to the generative AI model. The generative AI model unifies the slide backgrounds for presentation in the single canvas 301.

In some examples, the generative AI model can be prompted to combine the backgrounds on a pair-by-pair basis. For example, for each pair of slides with adjacent edges in the single canvas view, the AI model can be instructed to generate background content or elements that unify the two slides at that edge, taking into account only the elements local to that pair of edges. Thus, the elements that unify the edges of a slide pair at one location on the canvas may be somewhat different from elements that unify edges of a different slide pair at a different location in the single canvas view.

Alternatively, as in the example of FIG. 3, the generative AI model can produce a single common background 302 considering background data from all the slides. This background 302 then underlays the entire canvas 301. Then, an area 303 is assigned on the common background for the content from each of the contributing slides. These areas 303 are illustrated in FIG. 3 with boxes defined by broken lines. This is to indicate that the content areas 303 need not have any boxes or delineating lines. Rather, the content is placed in a respective area 303 but does not appear separated from other content areas. As noted above, the content can be any of the type of media typically embedded in a slide of a presentation application, including, but not limited to, text, image, audio video, applet or widget elements.

After the unified canvas 301 has been generated from a slide deck, as shown in FIG. 3, the user can interact with or display the unified canvas 301. The user interface 300 can also include a control 306 to save the unified canvas 301 in any of a number of formats. For example, the unified canvas 301 can be saved as a new presentation file, as a file formatted for a particular brainstorming or whiteboard application, as an image or document file, etc. The unified canvas can also be saved to Portable Document Format (PDF) or other format for sharing or printing.

Figure 4A:
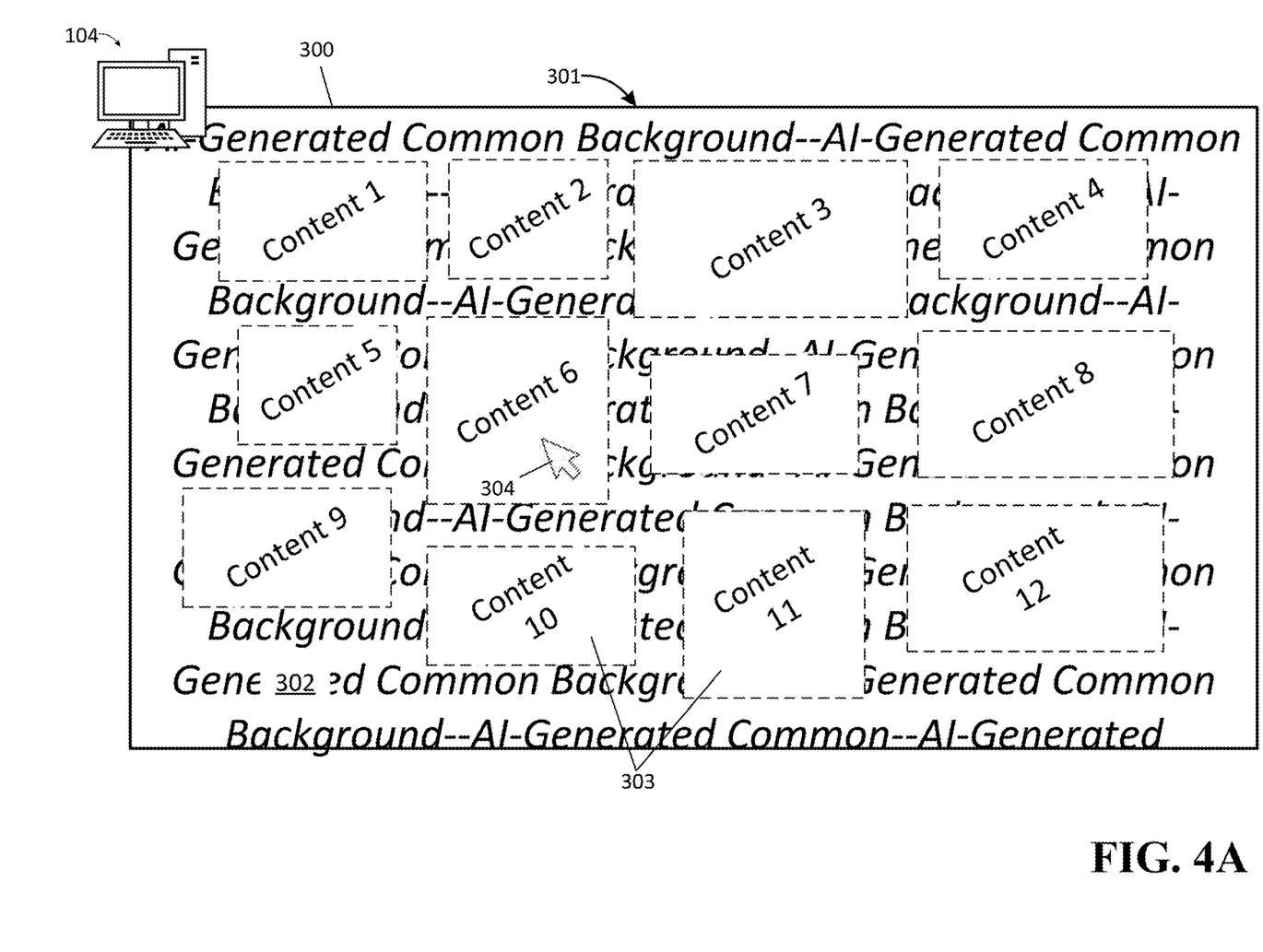
FIG. 4A depicts operation of the user interface of FIG. 3 implementing other aspects of this disclosure.
Figure 4B:
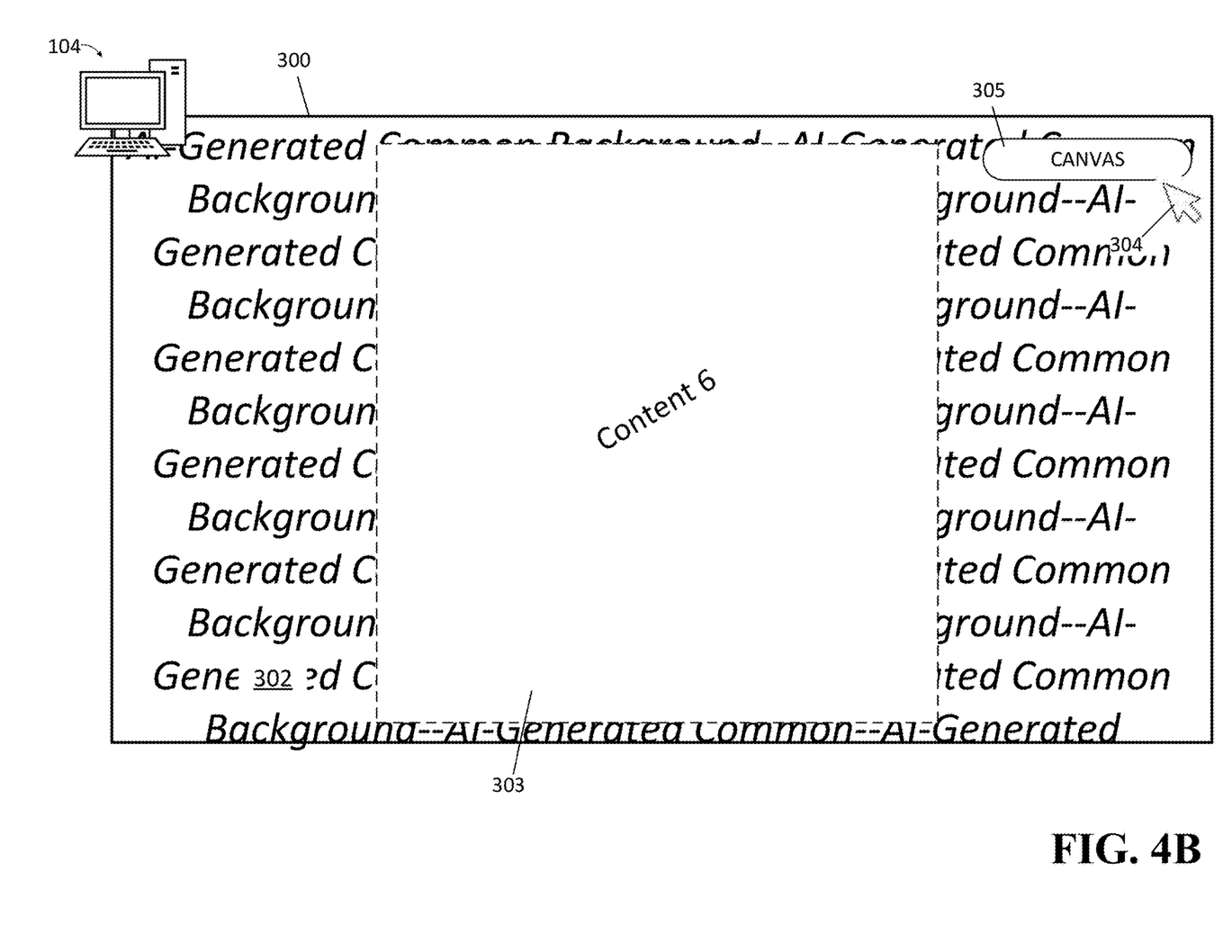
FIG. 4B depicts operation of the user interface of FIG. 3 implementing other aspects of this disclosure.

FIGS. 4A and 4B depict operation of the user interface of FIG. 3 implementing other aspects of this disclosure. As noted above, the typical linear arrangement of a slide deck can present technical problems during a presentation. For example, a presenter may anticipate the linear flow of a presentation and arrange the slides in that order. Then, when the presentation or discussion is underway, a member of the audience may ask a question or want to discuss a topic that is not in the linear order anticipated by the presenter. Traditionally, the presenter may have put off the question, indicating that the topic is to be covered later. This may be unsatisfying to the audience.

Alternatively, the presenter may take the presentation application out of presentation mode so that the applicable slide can be found and presented. This takes time and disrupts the natural flow of the conversation. The presenter may lose track of the discussion while trying to find the appropriate slide and, when the appropriate slide is found, the audience may have already moved on to another topic.

To address these technical problems. the user interface of FIG. 4A provides the following technical solutions. As shown in FIG. 4A, the user has pulled the content of all the slides into a unified canvas 301 for the presentation. With this interface 300, a presenter and audience can see all of the slide content at once. In an example scenario, the presenter may begin discussing the Content 1 of a first slide. Assume then that an audience member asks a question or raises concerns that related to Content 6 of that slide. Using a pointing device, such as a mouse or trackpad, of the user device 104, the presenter can select the content area 303 of a corresponding slide using a cursor 304.

As shown in FIG. 4B, this causes the interface 300 to focus on the content of the selected content area 303, i.e., Content 6. The discussion or presentation can then proceed immediately with reference to the applicable content. When this portion of the discussion is concluded or naturally flows to another topic, the user interface 300 provides a control 305 which can be activated to return to the canvas view of FIG. 4A. The presenter can then focus on another slide most applicable to the current direction of the discussion or refer to the entire canvas as needed.

FIG. 4B shows the focused content (Content 6) on the AI-generated common background. However, when a content area is focused in could, alternatively, fill the entire interface window or be displayed without any background. These options will be available to the user in the interface 102 of the presentation application 101.

Figure 5:
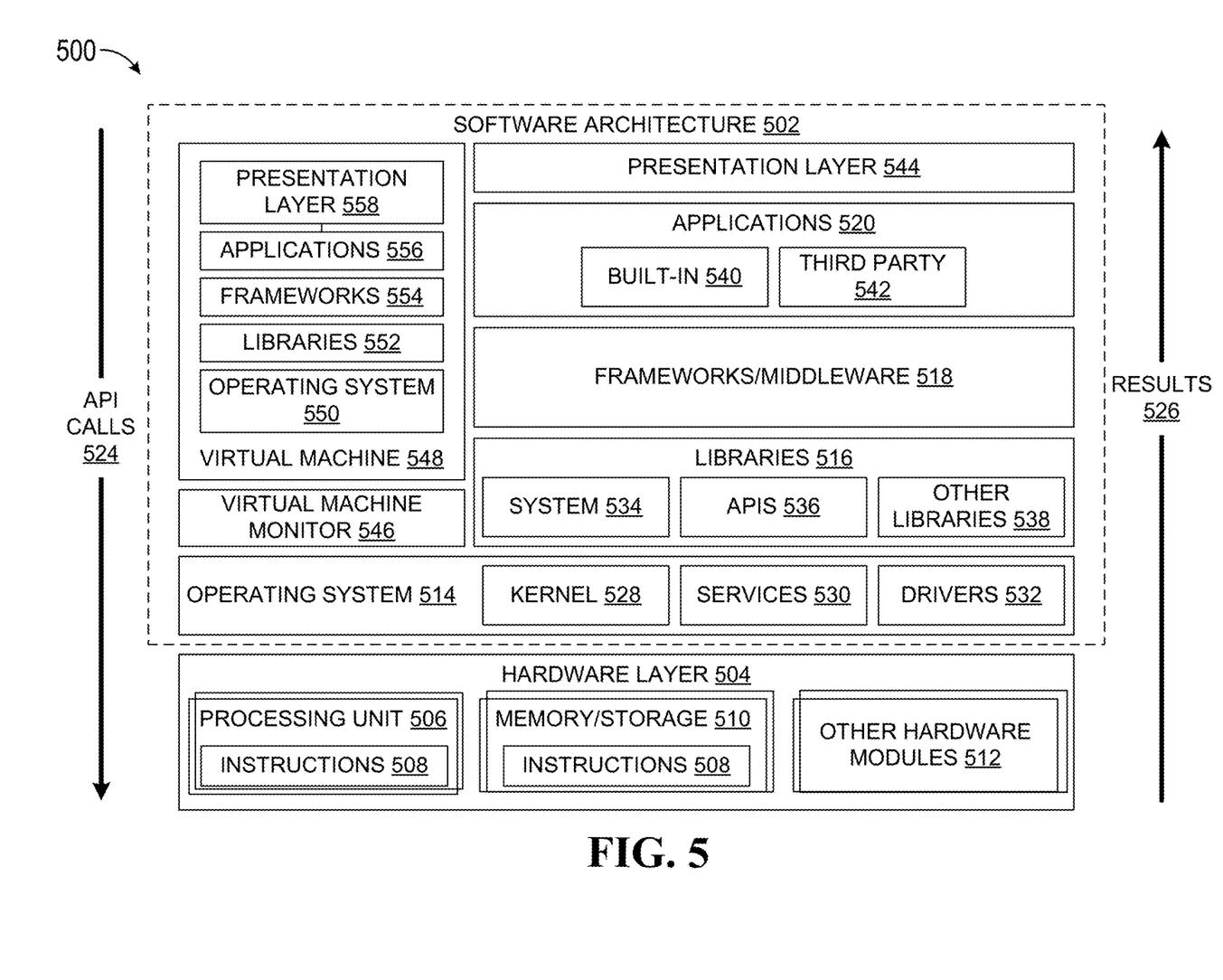
FIG. 5 is a block diagram illustrating an example software architecture, various portions of which may be used in conjunction with various hardware architectures herein described.

FIG. 5 is a block diagram 500 illustrating an example software architecture 502 that can be used for the presentation application or the prompt generator described herein. Various portions of the architecture 502 may be used in conjunction with various hardware architectures herein described, which may implement any of the above-described features.

FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
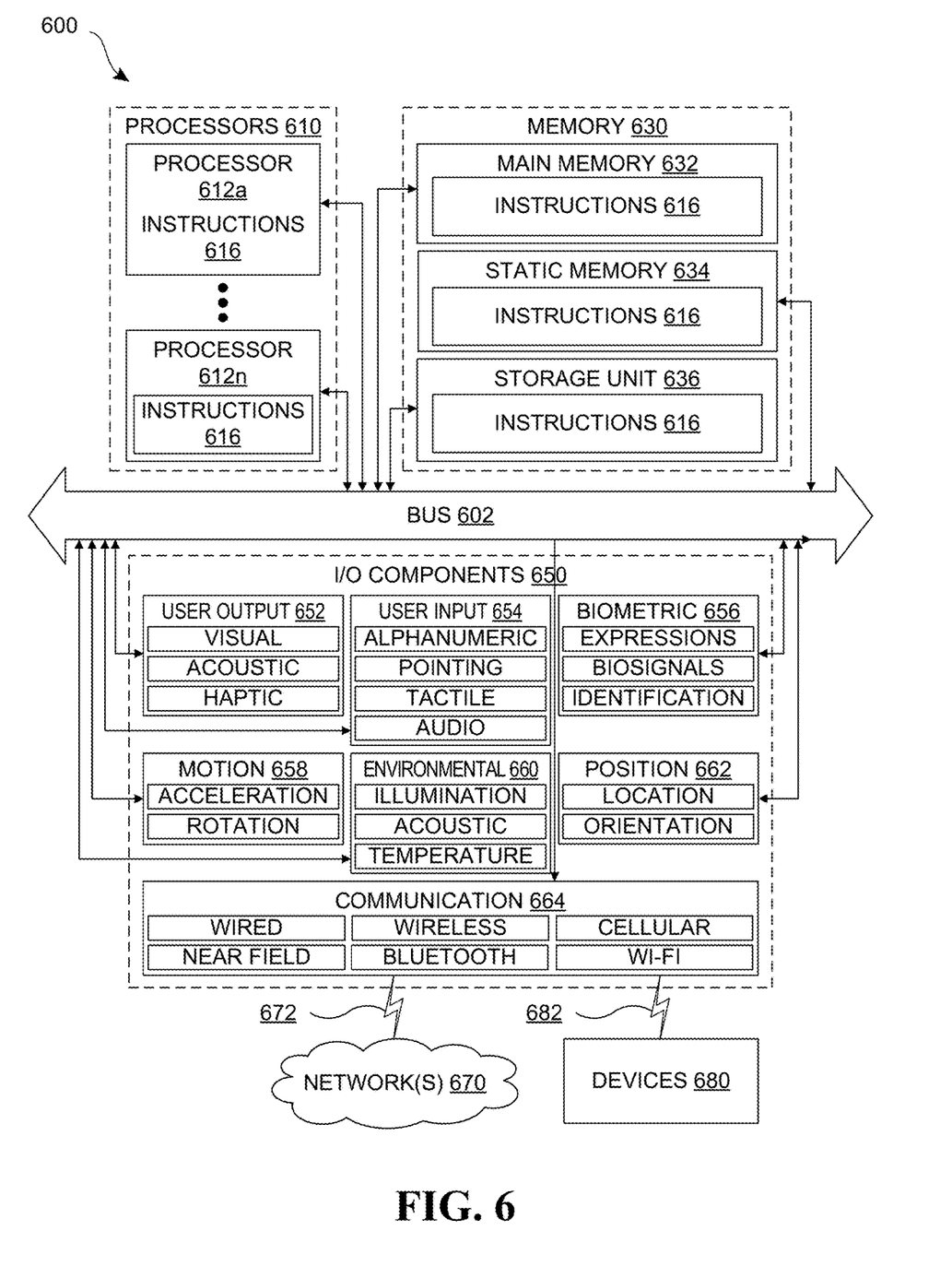
FIG. 6 is a block diagram illustrating components of an example machine configured to read instructions from a machine-readable medium and perform any of the features described herein.

FIG. 6 is a block diagram illustrating components of an example machine 600 which may be the user device or server described above. The machine 600 is configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A user device having a presentation application comprising:
 a processor;
 a memory storing the presentation application for implementation by the processor, alone or in combination with other processors;
 wherein the application comprises a user interface allowing a user to request integration of multiple slides into a single canvas with a common background generated by an Artificial Intelligence (AI) model based on backgrounds of the multiple slides being integrated into the single canvas.

Item 2. The user device of Item 1, further comprising a prompt generator to extract data from the multiple slides and structure a prompt with instructions for the AI model to generate the common background for integration of the multiple slides.

Item 3. The user device of Item 1, wherein the presentation application extracts data from the multiple slides and transmits the data with a call to a remote prompt generator to structure a prompt with instructions for the AI model to generate the common background for integration of the multiple slides.

Item 4. The user device of Item 1, wherein the common background comprises elements added to an edge region of a slide of the multiple slides.

Item 5. The user device of Item 1, wherein the user interface comprises a control to save the single canvas that integrates the multiple slides in any of a number of different formats.

Item 6. The user device of Item 1, wherein the user interface displays content from all of the multiple slides with the common background on the single canvas.

Item 7. The user device of Item 1, wherein the user interface comprises content areas on the single canvas, each content area containing content from a respective one of the multiple slides.

Item 8. The user device of Item 7, wherein, when a user selects one of the content areas during a presentation mode, a focused display of that content area is provided in the user interface.

Item 9. The user device of Item 8, wherein the focused display of the selected content area comprises a control for returning the user interface to a display of all the content areas on the single canvas.

Item 10. A method of integrating multiple discrete slides into a single canvas for a presentation application, the method comprising:
 extracting background data from the multiple slides;
 identifying adjacent edges of the multiple slides when position on the single canvas;
 generating a fused background with a generative Artificial Intelligence (AI) model based on the background data from adjacent slide edges; and
 combining the multiple slides on the single canvas using the fused background.

Item 11. The method of Item 10, further comprising receiving user input through a user interface allowing a user to request integration of the multiple slides into the single canvas.

Item 12. The method of Item 11, wherein the user interface comprises a control to save the single canvas that integrates the multiple slides in any of a number of different formats.

Item 13. The method of Item 10, further comprising, with a prompt generator, extracting the background data from the multiple slides and structuring a prompt with instructions for the AI model to generate the fused background for integration of the multiple slides.

Item 14. The method of Item 10, further comprising, with the presentation application, extracting the background data from the multiple slides and transmitting the background data with a call to a remote prompt generator to structure a prompt with instructions for the AI model to generate the fused background for integration of the multiple slides.

Item 15. The method of Item 10, wherein generating the fused background comprises adding elements to an edge region of a slide of the multiple slides based on elements from an edge region of an adjacent slide of the multiple slides.

Item 16. The method of Item 10, further comprising:
 with a user interface, displaying content from all of the multiple slides with the fused background on the single canvas;
 wherein the user interface comprises content areas on the single canvas, each content area containing content from a respective one of the multiple slides.

Item 17. The method of Item 16, further comprising, in response to a user selecting one of the content areas during a presentation mode, displaying a focused display of that content area in the user interface.

Item 18. The method of Item 17, wherein the focused display of the selected content area comprises a control for returning the user interface to a display of all the content areas on the single canvas.

Item 19. A presentation application stored on a non-transitory computer-readable medium, the medium storing instructions that, when executed by a processor, alone or in cooperation with other processors, implement the presentation application, the presentation application operable to:
 provide a user interface in which a user can organize a series of multiple slides;
 receive a user request for integration of the multiple slides into a single canvas;
 utilize a generative Artificial Intelligence (AI) model to generate a common background based on background data extracted from the multiple slides; and
 combine the multiple slides on the single canvas using the common background.

Item 20. The presentation application of Item 19, wherein the user interface is to
 display content from all of the multiple slides with the common background on the single canvas, wherein the user interface comprises content areas on the single canvas, each content area containing content from a respective one of the multiple slides;
 accept user input selecting one of the content areas during a presentation mode;
 display a focused display of the select content area; and
 provide a control for returning the user interface to a display of all the content areas on the single canvas.

In summary, the preceding description relates to presentations and a method for creating tileable slides that are joined or stitched together as seamless content among a plurality of separate slides by using generative AI to create 'in-between' slide content to match the slides being stitched to create tileable content. The examples provide show how the slide content is converted into appropriate prompts that are provided to a generative AI or Large Language Model (LLM) and how the output received from the model is used to create new content used for stitching separate slides together in a visually appealing way. An additional aspect includes the user experience of tileable slides that are presented in a unified canvas as storyboard and that are generated real-time as the user dynamically zooms in and out or changes a rotation angle of the slides.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A user device having a presentation application that organizes user content into a series of slides within a presentation file, the user device comprising:
    a processor;
    a memory storing the presentation application for implementation by the processor, alone or in combination with other processors; and
    a user interface of the presentation application, the user interface comprising a control allowing a user to request integration of multiple slides into a single canvas with a common background generated by an Artificial Intelligence (AI) model based on backgrounds of the multiple slides being integrated into the single canvas;
    the presentation application configured to receive the common background generated by the AI model and integrate the multiple slides into the single canvas using the common background to provide the single canvas comprising the user content of the series of slides presented with the common background as a unified visualization of the user content.

2. The user device of claim 1, further comprising a prompt generator to extract data from the multiple slides and structure a prompt with instructions for the AI model to generate the common background for integration of the multiple slides.

3. The user device of claim 1, wherein the presentation application extracts data from the multiple slides and transmits the data with a call to a remote prompt generator to structure a prompt with instructions for the AI model to generate the common background for integration of the multiple slides.

4. The user device of claim 1, wherein the common background comprises elements added to an edge region of a slide of the multiple slides to provide blending slide content to visually match adjacent, joined slides.

5. The user device of claim 1, wherein the user interface comprises a control to save the single canvas that integrates the multiple slides in any of a number of different formats.

6. The user device of claim 1, wherein the user interface displays content from all of the multiple slides arranged with the common background on the single canvas.

7. The user device of claim 1, wherein the user interface comprises content areas on the single canvas, each content area containing content from a respective one of the multiple slides.

8. The user device of claim 7, wherein, when a user selects one of the content areas during a presentation mode, a focused display of that content area is provided in the user interface.

9. The user device of claim 8, wherein the focused display of the selected content area comprises a control for returning the user interface to a display of all the content areas on the single canvas.

10. A method of integrating multiple discrete slides into a single canvas for a presentation application, the method comprising:
- extracting background data from the multiple slides based on data formatting or a location of an elements adjacent an edge of a slide;
- identifying adjacent edges of the multiple slides when positioned on the single canvas;
- structuring a prompt for a generative Artificial Intelligence (AI) model including the background data to produce a fused background for adjacent slides based on respective background data;
- generating a fused background with the AI model based on the background data from adjacent slide edges; and
- combining the multiple slides on the single canvas using the fused background such that slides are joined together as seamless content among the multiple slides.

11. The method of claim 10, further comprising receiving user input through a user interface allowing a user to request integration of the multiple slides into the single canvas.

12. The method of claim 11, wherein the user interface comprises a control to save the single canvas that integrates the multiple slides in any of a number of different formats.

13. The method of claim 10, further comprising, with a prompt generator, extracting the background data from the multiple slides and structuring a prompt with instructions for the AI model to generate the fused background for integration of the multiple slides.

14. The method of claim 10, further comprising, with the presentation application, extracting the background data from the multiple slides and transmitting the background data with a call to a remote prompt generator to structure a prompt with instructions for the AI model to generate the fused background for integration of the multiple slides.

15. The method of claim 10, wherein generating the fused background comprises adding elements to an edge region of a slide of the multiple slides based on elements from an edge region of an adjacent slide of the multiple slides.

16. The method of claim 10, further comprising:
- with a user interface, displaying content from all of the multiple slides with the fused background on the single canvas;
- wherein the user interface comprises content areas on the single canvas, each content area containing content from a respective one of the multiple slides.

17. The method of claim 16, further comprising, in response to a user selecting one of the content areas during a presentation mode, displaying a focused display of that content area in the user interface.

18. The method of claim 17, wherein the focused display of the selected content area comprises a control for returning the user interface to a display of all the content areas on the single canvas.

19. A presentation application stored on a non-transitory computer-readable medium, the medium storing instructions that, when executed by a processor, alone or in cooperation with other processors, implement the presentation application, the presentation application operable to:
- extract background data from multiple slides based on data formatting or a location of an elements adjacent to an edge of a slide;
- identify adjacent edges of the multiple slides when positioned on a single canvas;
- obtain a structured prompt for a generative Artificial Intelligence (AI) model including the background data to produce a fused background for adjacent slides based on respective background data;
- utilize the AI model to generate a fused background based on the background data from adjacent slide edges; and
- combine the multiple slides on the single canvas using the fused background.

20. The presentation application of claim 19, wherein a user interface is to
- display content from all of the multiple slides with the fused background on the single canvas, wherein the user interface comprises content areas on the single canvas, each content area containing content from a respective one of the multiple slides;
- accept user input selecting one of the content areas during a presentation mode;
- display a focused display of the select content area; and
- provide a control for returning the user interface to a display of all the content areas on the single canvas.

* * * * *